(12) United States Patent
Zegota et al.

(10) Patent No.: US 8,534,036 B2
(45) Date of Patent: Sep. 17, 2013

(54) CORN PICKER WITH ADAPTABLE SPEED CHOPPING UNIT

(75) Inventors: Thomas Zegota, Harsewinkel (DE); Sandor Esses, Turkeve (HU); Tibor Lenti, Csanadapaca (HU); Gabor Fuchs, Felsoezsolca (HU)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 199 days.

(21) Appl. No.: 13/176,968

(22) Filed: Jul. 6, 2011

(65) Prior Publication Data

US 2012/0055131 A1 Mar. 8, 2012

(30) Foreign Application Priority Data

Jul. 9, 2010 (DE) .......................... 10 2010 036 306

(51) Int. Cl.
*A01D 45/02* (2006.01)

(52) U.S. Cl.
USPC ............................................. 56/60; 56/10.8

(58) Field of Classification Search
USPC ............. 56/10.8, 11.1, 11.3–11.5, 11.7, 13.5, 56/13.6, 14.1–14.3, 14.5, 16.4 R, 16.5, 16.9, 56/17.3, 60
See application file for complete search history.

(56) References Cited

U.S. PATENT DOCUMENTS

| | | | | |
|---|---|---|---|---|
| 3,462,928 A | * | 8/1969 | Schreiner et al. | 56/104 |
| 3,488,980 A | * | 1/1970 | Burrough | 464/25 |
| 3,982,385 A | * | 9/1976 | Hyman | 56/106 |
| 3,988,877 A | * | 11/1976 | Martin et al. | 56/11.6 |
| 4,227,366 A | * | 10/1980 | Pucher | 56/14.2 |
| 4,419,856 A | * | 12/1983 | Taylor | 56/1 |
| 4,434,606 A | * | 3/1984 | Rhodes et al. | 56/106 |
| 4,581,878 A | * | 4/1986 | Vida et al. | 56/114 |
| 5,330,114 A | * | 7/1994 | Trenkamp et al. | 241/101.77 |
| 6,116,005 A | * | 9/2000 | Chamberlain | 56/10.2 G |
| 6,370,853 B1 | * | 4/2002 | Randall et al. | 56/14.2 |
| 6,412,259 B1 | * | 7/2002 | Wiegert | 56/60 |
| 7,047,717 B1 | * | 5/2006 | Wolters et al. | 56/60 |

FOREIGN PATENT DOCUMENTS

WO 2005/079555 9/2005

* cited by examiner

*Primary Examiner* — Thomas B Will
*Assistant Examiner* — Mai Nguyen
(74) *Attorney, Agent, or Firm* — Michael J. Striker

(57) ABSTRACT

A corn picker has at least two feed and snapping units which are driven by a drive shaft at the same operating speed, and each of which is equipped with a snapping gap and an intake conveyor mechanism which draws the plants into the snapping gap which is used to separate crops from the plants, and a chopping device for fragmentizing the stalks of the plants, which is disposed downstream of the particular intake conveyor mechanism, and the chopping unit has a drive which can be used to adapt the drive speed of the chopping unit when the operating speed of the feed and snapping units changes.

15 Claims, 4 Drawing Sheets

CORN PICKER WITH ADAPTABLE SPEED CHOPPING UNIT

CROSS-REFERENCE TO RELATED APPLICATION

The invention described and claimed hereinbelow is also described in German Patent Application DE 10 2010 036 306.5 filed on Jul. 9, 2010. This German Patent Application, whose subject matter is incorporated here by reference, provides the basis for a claim of priority of invention under 35 U.S.C. 119(a)-(d).

BACKGROUND OF THE INVENTION

The present invention relates to a corn picker.

Corn pickers of the initially described type are utilized as front attachments, for example, for combine harvesters, and are used to harvest corn plants and sunflower plants from the field, in which case the corn cobs and sunflower heads are picked and conveyed to the combine harvester, while the stalks and leaves remain on the field. Such corn pickers are equipped with at least two feed and snapping units, each of which comprises a snapping gap and an intake conveyor mechanism, and each being driven at the same operating speed by a drive shaft. The intake conveyor mechanism draws the plants into the snapping gap which is used to separate corn cobs and sunflower heads from the plants. The corn picker also comprises a chopping unit downstream of the particular intake conveyor mechanism for fragmentizing the stalks of the plants.

Document WO 2005/079555 A1 makes known such a corn picker, the feed and snapping units of which are driven jointly by a drive shaft extending across the width of the corn picker. Each of the feed and snapping units of the corn pickers is equipped with a chopping unit for fragmentizing the stalks remaining on the field, in order to accelerate the rotting thereof and simplify soil management. The chopping units are disposed downstream of the particular feed and snapping unit, and are operatively connected to the drive shaft. The feed and snapping units, and the chopping units thereof, are driven by the common drive shaft of the corn picker, and therefore any change in the operating speed at which the feed and snapping units are driven results in a change in the drive speed of the chopping units. As a result, in particular, a reduction in the operating speed or drive speed of the chopping units leads to negative chopping results and generates high torques in the drive train.

SUMMARY OF THE INVENTION

The problem addressed by the present invention is therefore that of providing a corn picker of the initially stated type, which prevents the effects of the speed dependence of the chopping units on the feed and snapping units.

According to the present invention, the chopping unit comprises a drive means which can be used to adapt the drive speed of the chopping unit when the operating speed of the feed and snapping units changes. By adapting the drive speed of the chopping unit when the operating speed of the feed and snapping units changes, improved chopping results are attained, in particular at a reduced operating speed, since the drive speed of the chopping unit can be maintained at least at the level that existed before the operating speed was changed. Moreover, the adaptability of the drive speed of the chopping unit makes it possible to increase the drive speed with respect to the operating speed of the feed and snapping unit. The power consumption of the corn picker can be optimized in this manner, since the drive speed can be adapted to the particular harvesting situation.

Preferably, the drive means can be a shift stage via which the drive shaft is connected to the chopping unit. The shift stage makes it possible to assign several—although at least two—transmission ratios in a defined manner, thereby enabling the drive speed of the chopping unit to be varied with respect to the operating speed of the feed and snapping unit. The use of a shift stage also satisfies the requirements on the limited installation space, since it can be easily integrated therein.

Preferably the shift stage can be actuated mechanically, hydraulically, electro-hydraulically, or pneumatically.

In particular, the shift stage can be designed as a form-locking transmission. For instance, the shift stage can be designed as a planetary gear set with shift stage and clutch, or as a spur gear stage.

Alternatively, the shift stage can be designed as a force-locking transmission. It can be a belt transmission in particular.

In a preferred development, the drive means can be designed as a single-motor drive via which the chopping unit can be driven. To this end, a hydraulic motor or an electric motor can be used as the drive.

Advantageously, the drive speed can be changed steplessly, which is easily achieved by designing the drive means of the chopping unit as a hydraulic motor or an electric motor.

Alternatively, the drive means can be designed as a torque-transfer device which interconnects at least a portion of the chopping units of the feed and snapping units, and can be acted upon with an adjustable torque independently of the drive shaft which is driving the feed and snapping unit.

To this end, the torque-transfer device can be designed as a shaft which connects at least a portion of the chopping units. It would also be feasible to design the torque-transfer device as a belt drive.

The torque-transfer device can be acted upon by a separate drive which is controlled by a separate control unit. The torque-transfer device can also be connected via a transmission to a drive train which drives the drive shaft, to enable the drive speed—which is supposed to be transferred by the torque-transfer device to the chopping unit—to be adapted when the operating speed transferred via the drive shaft to the feed and snapping unit changes.

The present invention also relates to a self-propelled harvesting machine comprising a corn picker, which is characterized in that the drive speed of the chopping unit can be varied depending on the forward speed of the self-propelled harvesting machine. A reduction in forward speed results in a reduction of the operating speed of the feed and snapping units. The drive speed of the chopping units is adapted when the operating speed of the feed and snapping units changes, in order to maintain a drive speed that is higher than the operating speed if the forward speed and drive speed decrease.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
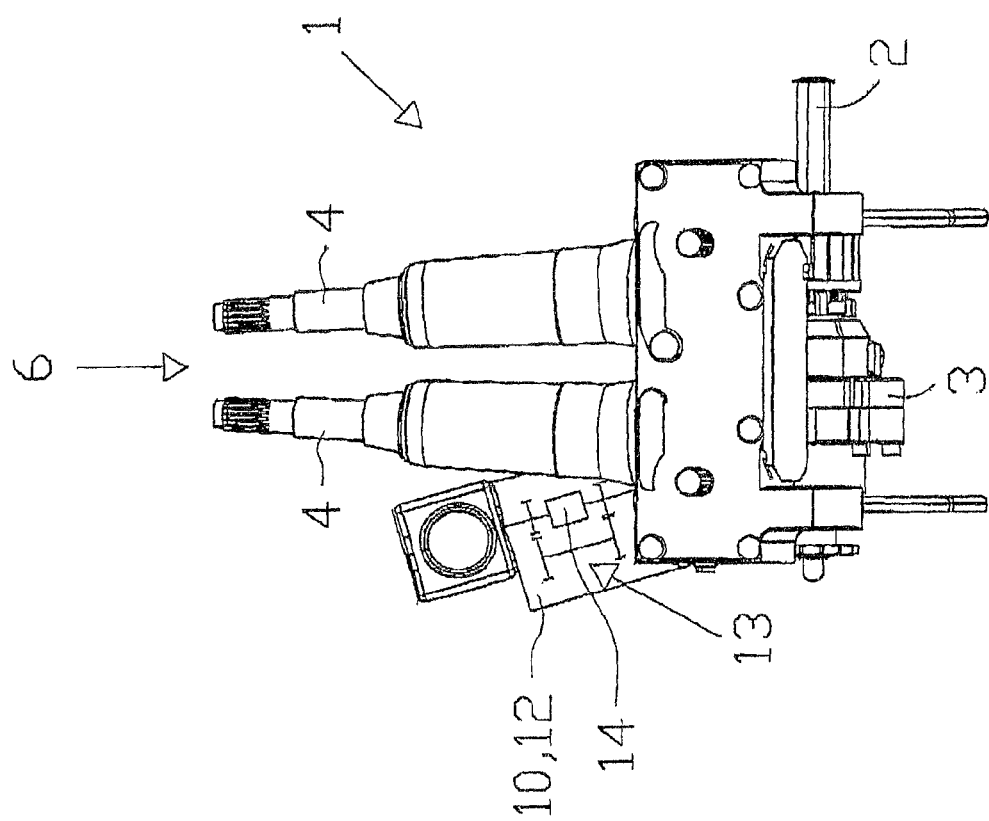
FIG. 1 shows a top view of a schematically depicted feed and snapping unit, in a first embodiment of the present invention.

FIG. 1 shows a top view of a schematically depicted, individual feed and snapping unit 1 of a corn picker which comprises a plurality of feed and snapping units 1, in a first embodiment. Feed and snapping unit 1 comprises a picker transmission 3 which transfers a torque—which is provided by a drive shaft 2 of the corn picker and is transferred by an agricultural harvesting machine to drive shaft 2—to an intake conveyor mechanism which comprises parallel, adjacently situated snapping roller drive shafts 4 on which snapping rollers as shown in FIG. 2 are disposed.

A snapping gap 6 which is used to separate crops from the plants forms between snapping rollers 5. To this end, the intake conveyor mechanism is enclosed by a picker frame on which stripper knives and stripper bars which limit snapping gap 6 are provided. A chopping unit 7 for fragmentizing the stalks of the plants is disposed downstream of the particular intake conveyor mechanism and comprises a knife 8 which is rotatable about a vertical axis and is mounted on a knife carrier 9, as shown in FIG. 2.

Chopping unit 7 comprises a drive means 10 on which knife carrier 9 with knives 8 is disposed. Drive means 10 is operatively connected to drive shaft 2 of the corn picker. A bevel gear set is provided in housing 10 in order to transfer the drive torque, in a fixed, transmission ratio, which is required to drive chopping unit 7 and is tapped from the drive shaft by drive means 10.

Figure 2:
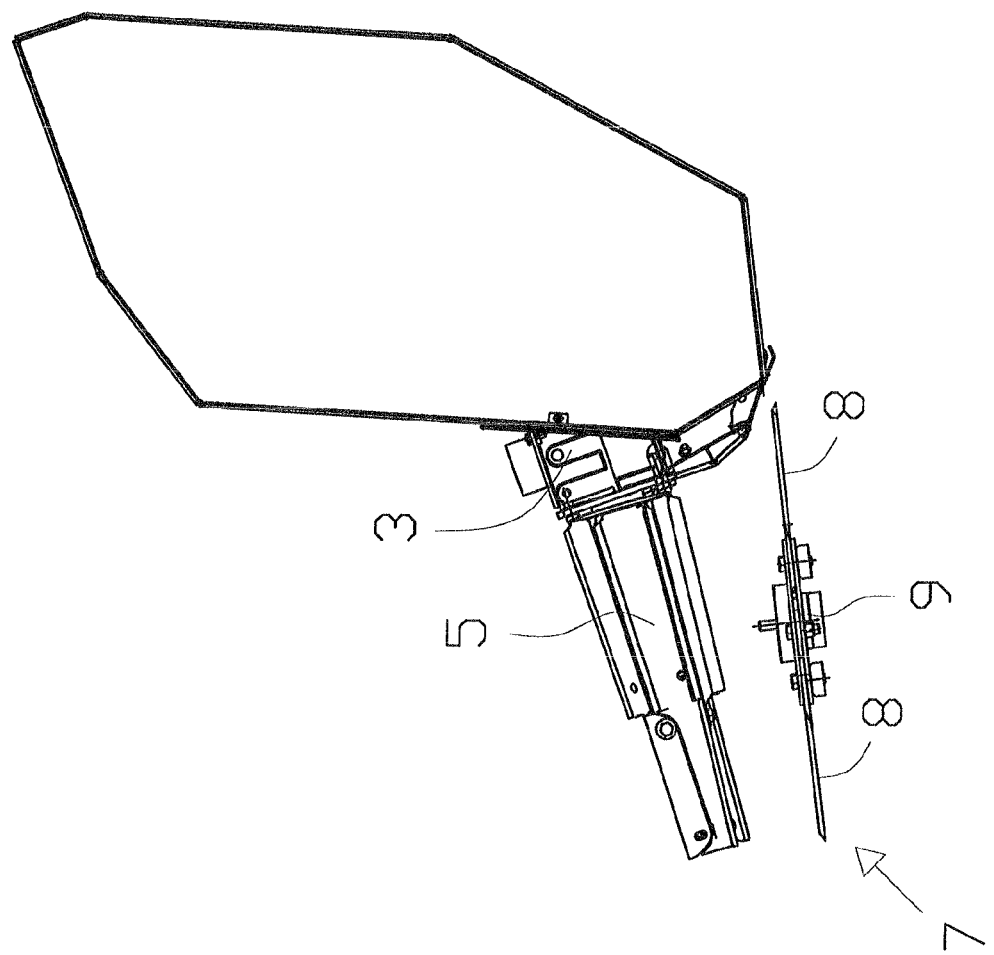
FIG. 2 shows a side view of a schematically depicted corn picker of the present invention.

In the embodiment shown in FIGS. 1 and 2, drive means 10 is designed as a shift stage 12 which, in the present case, comprises a two-staged transmission 13 which can be actuated by a clutch 14 which also performs a safeguard function if chopping unit 7 becomes overloaded. By actuating clutch 14, the drive torque provided by drive shaft 2 can be transferred to chopping unit 7 in a first transmission ratio i1 or a second transmission ratio i2. A greater number of transmission ratios can be obtained by modifying transmission 13 accordingly.

Clutch 14 can be actuated in a load-free manner in the idling state of feed and snapping unit 1, in order to change the drive speed of chopping units 7 if the chopping result worsens, or in a loaded manner if the forward speed of an agricultural working machine which is equipped with and drives the corn picker changes, in particular decreases. Reducing the forward speed results in a reduction of the drive torque provided by drive shaft 2, and the operating speed of feed and snapping unit 1. In the case of corn pickers according to the prior art, this also causes the drive speed of chopping unit 7 to decrease, which leads to negative chopping results and high torques in the drive train.

Due to the drive means 10, which are in the form of a shift stage 12 and are connected between drive shaft 2 and chopping unit 7, the drive speed of chopping unit 7 can be adapted when the operating speed of feed and snapping unit 1 changes as a result of the forward speed changing. To this end, if a specifiable operating speed is fallen below, shift stage 12 can be actuated automatically in order to change the transmission ratio in shift stage 12 such that chopping unit 7 operates at a higher drive speed than would be specified by the operating speed of feed and snapping unit 1, as is common according to the prior art.

Figure 3:
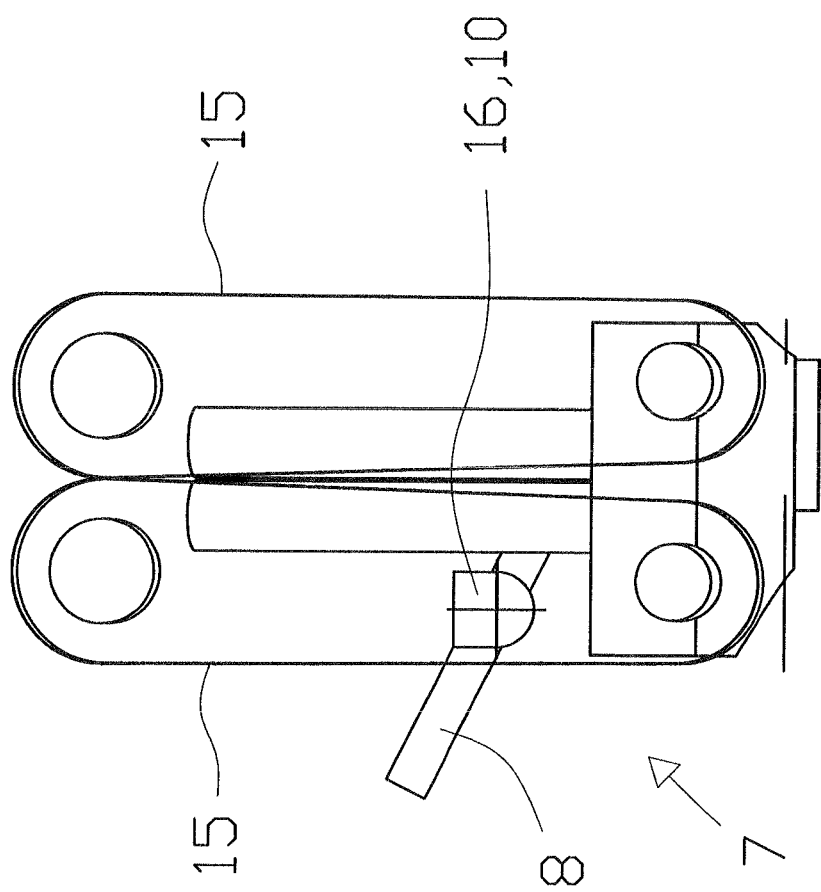
FIG. 3 shows a top view of a schematically depicted feed and snapping unit, in a second embodiment of the present invention.

FIG. 3 depicts a second embodiment of a feed and snapping unit 1 of a corn picker. FIG. 3 shows a top view of a schematically depicted, individual feed and snapping unit 1, and further individual parts of feed and snapping unit 1. As shown in FIG. 3, feed and snapping unit 1 also comprises a conveyor chain 15 which is used to draw in the stalks of plants, the crops of which are stripped off in snapping gap 6. This second embodiment differs from that shown in FIGS. 1 and 2 in that respective chopping unit 7 comprises a drive means 10 which is designed as a single-motor drive 16.

Figure 4:
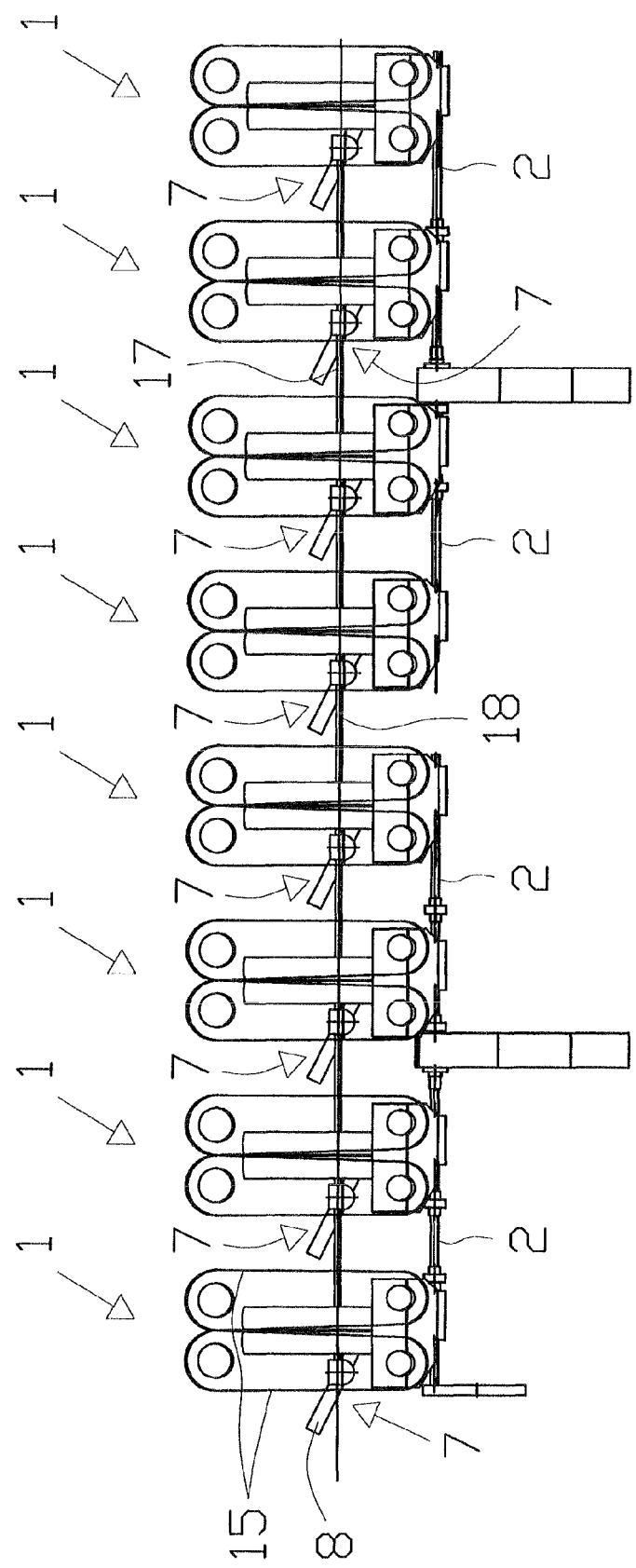
FIG. 4 shows a top view of a schematically depicted feed and snapping unit, in a third embodiment of the present invention.

FIG. 4 shows a third embodiment of a feed and snapping unit 1 of a corn picker. The depiction shows a schematic view from above of a corn picker which is composed of a plurality of adjacently disposed feed and snapping units 1 of the type described above. In this third embodiment, drive means 10 of the chopping unit is designed as a torque-transfer device 17 which interconnects all chopping units 7 of the corn picker. Torque-transfer device 17 can be a continuous shaft 18, for example, which is driven independently of drive shaft 2 which drives feed and snapping units 1, or is connected thereto via a shift stage.

It will be understood that each of the elements described above, or two or more together, may also find a useful application in other types of constructions differing from the types described above.

While the invention has been illustrated and described as embodied in a corn picker, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A corn picker, comprising
    at least two feed and snapping units, wherein each of said feed and snapping units is provided with a snapping gap, an intake conveyor mechanism which draws plants into said snapping gap and which is used to separate crops from plants and a drive means;
    a drive shaft driving said feed and snapping units at the same operating speed; and
    chopping units for fragmentizing stalks of the plants,
    wherein each of said chopping units is disposed downstream of a corresponding one of said intake conveyor mechanisms of said at least two feed and snapping units, and
    wherein each said drive means adapts a drive speed of each said chopping unit of said corresponding intake conveyor mechanism when the operating speed of said feed and snapping units changes, including maintaining the drive speed after a decrease in the operating speed.

2. The corn picker as defined in claim 1, wherein said drive means is a shift stage via which said drive shaft is connected to said chopping unit in a driving manner.

3. The corn picker as defined in claim 2, wherein said shift stage is a shift stage which is actuated in a manner selected from the group consisting of mechanically, hydraulically, pneumatically and electro-hydraulically.

4. The corn picker as defined in claim 2, wherein said shift stage is a form-locking transmission.

5. The corn picker as defined in claim 2, wherein said shift stage is a force-locking transmission.

6. The corn picker as defined in claim 1, wherein each said drive means is a separate drive via which each said chopping unit is driven.

7. The corn picker as defined in claim 6, wherein each said separate drive has a steplessly adjustable drive speed.

8. The corn picker as defined in claim 6, wherein each said separate drive is a single-motor drive of said chopping unit.

9. The corn picker as defined in claim 1, wherein said drive shaft is driven synchronously with a forward speed of the self-propelled harvesting machine and wherein each said drive means drives each said chopping unit and adjusts the drive speed to be variable depending upon a forward speed.

10. The corn picker as defined in claim 1, wherein said drive means includes a torque-transfer device comprising a shift-stage transmission that interconnects said chopping units to said feed and snapping units and transfers a drive torque from the drive shaft to said respective chopping unit in a first or a second transmission ratio.

11. A corn picker, comprising
    at least two feed and snapping units, wherein each of said feed and said snapping units comprises a snapping gap used to separate crops from plants, an intake conveyor mechanism which draws plants into said snapping gap and a shift-stage transmission;
    a drive shaft driving said feed and snapping units at the same operating speed; and
    at least two chopping units for fragmentizing stalks of the plants, each of which at least two chopping units is disposed downstream of a corresponding one of said at least two intake conveyor mechanisms;
    wherein each said shift-stage transmission couples said drive shaft to each said chopping unit and adapts a drive speed of said chopping unit when the operating speed of said feed and snapping units changes including maintaining the drive speed after a decrease in the operating speed.

12. The corn picker as defined in claim 11, wherein said shift-stage transmission adapts the drive speed of said chopping unit to be greater that the operating speed.

13. The corn picker as defined in claim 10, wherein said shift-stage transmission is a two-staged transmission actuated by a clutch that performs a safeguard function if said chopping unit becomes overloaded.

14. The corn picker as defined in claim 2, wherein said shift-stage comprises a two-staged transmission actuated by a clutch that performs a safeguard function if said chopping unit becomes overloaded.

15. The corn picker as defined in claim 14, wherein said two-stage transmission transfers a drive torque from the drive shaft to said respective chopping unit in a first or a second transmission ratio.

* * * * *